United States Patent
Lee et al.

(10) Patent No.: US 7,366,124 B2
(45) Date of Patent: Apr. 29, 2008

(54) APPARATUS AND METHOD FOR DISCONTINUOUSLY RECEIVING MBMS NOTIFICATION INDICATOR IN MOBILE COMMUNICATION SYSTEM

(75) Inventors: Young Dae Lee, Kyoungki-do (KR); Seung-June Yi, Seoul (KR); Sung-Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 481 days.

(21) Appl. No.: 11/029,204

(22) Filed: Jan. 4, 2005

(65) Prior Publication Data
US 2005/0176474 A1    Aug. 11, 2005

(30) Foreign Application Priority Data
Jan. 9, 2004    (KR) ................. 10-2004-0001592

(51) Int. Cl.
*H04H 1/00* (2006.01)
*H04J 3/24* (2006.01)

(52) U.S. Cl. ................. 370/312; 370/313; 370/329; 455/458; 455/574; 455/426.1

(58) Field of Classification Search ............... 370/312, 370/432, 313, 329; 455/466, 574, 458, 426.1
See application file for complete search history.

(56) References Cited

U.S. PATENT DOCUMENTS 7,197,323 B2 *   3/2007   Terry .................... 455/458

2003/0157949 A1   8/2003   Sarkkinen et al.
2006/0104225 A1 *   5/2006   Kim et al. .............. 370/313

FOREIGN PATENT DOCUMENTS

| EP | 1317156 A1 | 6/2003 |
|---|---|---|
| EP | 1377099 A1 | 1/2004 |
| GB | 2406751 A * | 4/2005 |
| KR | 20-0334544 | 11/2003 |
| WO | 0251171 A | 6/2002 |
| WO | WO 03/015439 A1 | 2/2003 |
| WO | WO 03/058992 A1 | 7/2003 |

* cited by examiner

*Primary Examiner*—Charles N. Appiah
*Assistant Examiner*—Liton Miah
(74) *Attorney, Agent, or Firm*—Lee, Hong, Degerman, Kang & Schmadeka

(57) ABSTRACT

An apparatus and method for receiving an MBMS (Multimedia Multicast/Broadcast Service) notification indicator allows discontinuous reception of an MBMS notification indicator in a mobile communication system. A mobile terminal receives and stores a terminal-specific DRX (Discontinuous Reception) cycle length and the longest DRX cycle length broadcasted in a cell. The mobile terminal discontinuously receives a notification indicator for a specific MBMS during a terminal-specific DRX cycle length of the longest DRX cycle length by using the stored terminal-specific DRX cycle length and the longest DRX cycle length used in a cell.

24 Claims, 4 Drawing Sheets

APPARATUS AND METHOD FOR DISCONTINUOUSLY RECEIVING MBMS NOTIFICATION INDICATOR IN MOBILE COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. 2004-0001592, filed on Jan. 9, 2004, the contents of which is hereby incorporated by reference herein in its entirety.

BACKGROUND OF THE INVENTION

1. Field of the Invention

The present invention relates to a multicast or broadcast in a mobile communication system and, more particularly, to an apparatus and method for discontinuously receiving a notification indicator with respect to multicast or broadcast service.

2. Description of the Related Art

FIG. 1 illustrates an exemplary basic structure of a general UMTS (Universal Mobile Telecommunications System) network. As shown in FIG. 1, the UMTS is generally divided into a mobile terminal (or user equipment: UE), a UTRAN (UMTS Terrestrial Radio Access Network), and a core network (CN).

The UTRAN includes one or more radio network subsystems (RNS). Each RNS includes a radio network controller (RNC), and a plurality of Node-Bs managed by the RNC. One or more cells exist in one Node B.

The radio interface protocol layers between the mobile terminal and the UTRAN can be divided into a first layer (L1), a second layer (L2), and a third layer (L3) based on the three lower layers of an open system interconnection (OSI) standard model.

A physical layer belonging to the first layer provides an information transfer service using a physical channel, and a radio resource control (RRC) layer positioned in the third layer services to control radio resources between the mobile terminal and the UTRAN. For this purpose, the RRC layer exchanges information between the mobile terminal and the UTRAN.

When an RRC layer of a specific mobile terminal and an RRC layer of the UTRAN are connected to exchange an RRC message with each other, the corresponding terminal is in an RRC-connected state, and when the mobile terminal is not in the RRC-connected state, the mobile terminal is in an idle state. The RRC-connected state of the mobile terminal can be divided into an URA_PCH state, a CELL_PCH state, a CELL_FACH state and a CELL_DCH state.

When a terminal is in the URA_PCH state or in the CELL_PCH state, in order to reduce power consumption, the mobile terminal wakes up at every discontinuous reception (DRX) cycle length to receive a paging indicator channel (PICH), which is a physical channel, by using a DRX method. Namely, the mobile terminal either in the URA_PCH state or in the CELL_PCH state receives and stores the UTRAN specific DRX cycle length, and discontinuously receives the PICH according to the UTRAN specified DRX cycle length.

If a mobile terminal is in the idle state, it receives and stores a CN domain specific DRX cycle length, and discontinuously receives the PICH according to the CN domain specific DRX cycle length. Namely, mobile terminals obtain and use the CN domain specific DRX cycle length according to its state through system information broadcast by the RRC.

A multimedia broadcast/multicast service (MBMS) will be described in detail as follows. The MBMS refers to a method for providing a streaming or a background service to one or multiple terminals by using a downlink-dedicated MBMS bearer service. One MBMS service includes one or more sessions, and MBMS data is transferred to one or multiple terminals through the MBMS bearer service only when the session is ongoing.

The UTRAN, providing an MBMS, transmits an RRC message related to the MBMS to multiple terminals through an MCCH (MBMS Control Channel), a logical channel. The MCCH is a point-to-multipoint downlink channel mapped to a FACH (Forward Access Channel), a transport channel. The FACH is mapped to a SCCPCH (Secondary Common Control Physical Channel), a physical channel.

FIGS. 2A and 2B illustrate the structure of the MICH (MBMS specific paging Indicator Channel), a physical channel, namely, the PICH dedicated for the MBMS.

As shown in FIGS. 2A and 2B, the UTRAN providing the MBMS service transmits an MI (MBMS notification Indicator) by using the MICH. With reference to FIG. 2A, the MICH transmits the MI by using 12 least significant bits (LSB), which are non-used bits of the PICH of one frame, or transmits one or more MIs by using all 300 bits of one frame as shown in FIG. 2B.

When a mobile terminal desires to receive one or more MBMS services, it discontinuously receives the MICH together with the PICH at every UTRAN specified DRX cycle length or CN domain specified DRX cycle length corresponding to its state. In this case, the mobile terminal receives a 10 ms frame of the PICH and a 10 ms frame of MICH. The terminal obtains the MI corresponding to an MBMS service ID desired to be received from the received MICH, and if the obtained MI includes MCCH reception indication information, the mobile terminal receives an RRC message through the MCCH. The MCCH reception indication information indicates that a message for a specific MBMS will be transmitted by the MCCH, which the UTRAN transfers to terminals that desire to receive the specific MBMS.

FIG. 3 illustrates one example of related art MICH transmission. With reference to FIG. 3, the UTRAN transmits a plurality of MIs once with respect to every MBMS provided in a corresponding cell during the 10 ms frame of the MICH, and transmits the plurality of MIs at every 10 ms frame repeatedly. When a message with respect to the specific MBMS is transmitted through the MCCH, the UTRAN transmits the MCCH reception indication information indicating that the MCCH will be transmitted through one MI to the mobile terminals.

In order for every corresponding terminals of a cell to receive the MCCH reception indication information, the UTRAN repeatedly transmits the MCCH reception indication information through the MI during the longest DRX cycle length in a cell. Namely, the UTRAN repeatedly transmits the MCCH reception indication information through the MI at every frame during the longest one of the UTRAN specified DRX cycle length and the CN domain specified DRX cycle length.

In addition, considering such a situation that a mobile terminal may not receive the MI due to a bad radio environment, the UTRAN repeatedly transmits the MI during the length of double (M) the longest DRX cycle length. When a notification indicator with respect to a specific MBMS, namely, the MCCH reception indication information is generated, the UTRAN repeatedly transmits the MCCH reception indication information within the cycle length of (M×the longest DRX cycle length).

For example, assuming that 'M' is 1 and the longest DRX cycle length is 5120 ms, if the MCCH reception indication information with respect to the specific MBMS is generated, the UTRAN repeatedly transmits the MI bearing the MCCH reception indication information within 5120 ms (namely, 1×5120 ms). If 'M' is 3 and the longest DRX reception cycle length is 5120 ms and the MCCH reception indication information with respect to a specific MBMS is generated, the UTRAN repeatedly transmits the MI bearing the MCCH reception indication information within 15360 ms (namely, 3×5120 ms). If 'M' is 2 as shown in FIG. 3, the UTRAN repeatedly transmits the MI bearing the MCCH reception indication information during two successive longest DRX reception cycle length, namely, during 10240 ms.

The mobile terminal receives the MI once during the DRX reception cycle length according to its RRC state. With reference to FIG. 3, the UTRAN repeatedly transmits the MI at every frame during the longest DRX cycle length (5120 ms) in the cell, but the mobile terminal receives the MI with respect to the MBMS that the mobile terminal itself receives at every 640 ms, which is the terminal-specific DRX cycle length.

In the related art, the mobile terminal obtains the MI by receiving the MICH once at every terminal-specific DRX cycle length, and recognizes whether the obtained MI includes MCCH reception indication information for the specific MBMS. The UTRAN repeatedly transmits the MI bearing the MCCH reception indication information for the specific MBMS at each and every frame during the longest DRX cycle length in the cell.

In this respect, as shown in FIG. 3, in most cases, since the longest DRX cycle length of the cell is the multiple of the terminal-specific DRX cycle length, the mobile terminal checks and repeatedly receives the MI bearing the same MCCH reception indication information.

In addition, if the UTRAN repeatedly transmits the same MCCH reception indication information during the multiple of the longest DRX cycle length of the cell, the mobile terminal has to repeatedly receive the same MCCH reception indication information.

SUMMARY OF THE INVENTION

Therefore, one object of the present invention is to provide a discontinuous reception method capable of discontinuously receiving a notification indicator with respect to multicast or broadcast effectively.

Another object of the present invention is to provide a discontinuous reception method capable of effectively receiving an MICH by preventing a mobile terminal from repeatedly receiving the same MCCH reception indication information for a specific MBMS service.

To achieve at least the above objects in whole or in parts, there is provided a method for receiving an MBMS (also refer to as a point-to-multipoint service) notification indicator for a point-to-multipoint service in a mobile communication system. The method comprises receiving a plurality of discontinuous-reception (DRX) cycle lengths from a network; recognizing the longest DRX cycle length from the plurality of DRX cycle lengths; determining a point-to-multipoint DRX cycle length based on the longest DRX cycle length; and determining whether to receive the notification indicator for the point-to-multipoint service, wherein if the notification indicator has been received in a point-to-multipoint DRX cycle having the point-to-multipoint DRX cycle length, the mobile terminal suspends receiving of the notification indicator in the same point-to-multipoint DRX cycle. Preferably, the notification indicator contains control information associated with receiving the point-to-multipoint service. Preferably, the plurality of DRX cycle lengths are provided from one of UTRAN and a core network.

According to one aspect of the present invention, the point-to-multipoint DRX cycle length is equal to the longest DRX cycle length. Alternatively, the point-to-multipoint DRX cycle length is M times the longest DRX cycle length, where M is an integer.

According to another aspect of the present invention, if the notification indicator has not been received in the point-to-multipoint DRX cycle having the point-to-multipoint DRX cycle length, the mobile terminal receives a subsequent notification indicator in the same point-to-multipoint DRX cycle.

According to another aspect of the present invention, the DRX cycle length is associated with receiving a mobile terminal dedicated indicator from the network.

According to another aspect of the present invention, the notification indicator is provided using a point-to-multipoint paging indicator channel and preferably a MICH.

According to another embodiment, a mobile terminal for receiving a notification indicator for a point-to-multipoint service in a mobile communication system comprises means for receiving a plurality of discontinuous-reception (DRX) cycle lengths from a network; means for recognizing the longest DRX cycle length from the plurality of DRX cycle lengths; means for determining a point-to-multipoint DRX cycle length based on the longest DRX cycle length; and means for determining whether to receive the notification indicator for the point-to-multipoint service, wherein if the notification indicator has been received in a point-to-multipoint DRX cycle having the point-to-multipoint DRX cycle length, the mobile terminal suspends receiving of the notification indicator in the same point-to-multipoint DRX cycle. Preferably, a processor may be used to perform the functions described above.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention is implemented in a mobile communication system, such as a UMTS developed by 3GPP. Also, the present invention can be applied for communication systems operating according to any other standards. Preferred embodiments of the present invention will now be described.

The present invention proposes a method in which a terminal stores a terminal-specific DRX cycle length and a DRX cycle length for an MBMS, and then, discontinuously receives a notification indicator for the MBMS by using the terminal-specific DRX cycle length and the longest DRX cycle length.

For this purpose, in the method for discontinuously receiving an MBMS notification indicator, the network (for example, UTRAN) receives and stores the terminal-specific DRX cycle length among UTRAN transmitted DRX cycle lengths, and also receives and stores the longest DRX cycle length among, preferably, all of the transmitted DRX cycle lengths in a cell.

The terminal-specific DRX cycle length is used to receive a notification indicator with respect to a terminal-specific service (for example, a voice call) and the longest DRX cycle length is used to receive a notification indicator for an MBMS.

Preferably, the notification indicator with respect to the mobile terminal-specific service is transmitted through a PICH, and the notification indicator for the MBMS is transmitted through an MICH.

Figure 1:
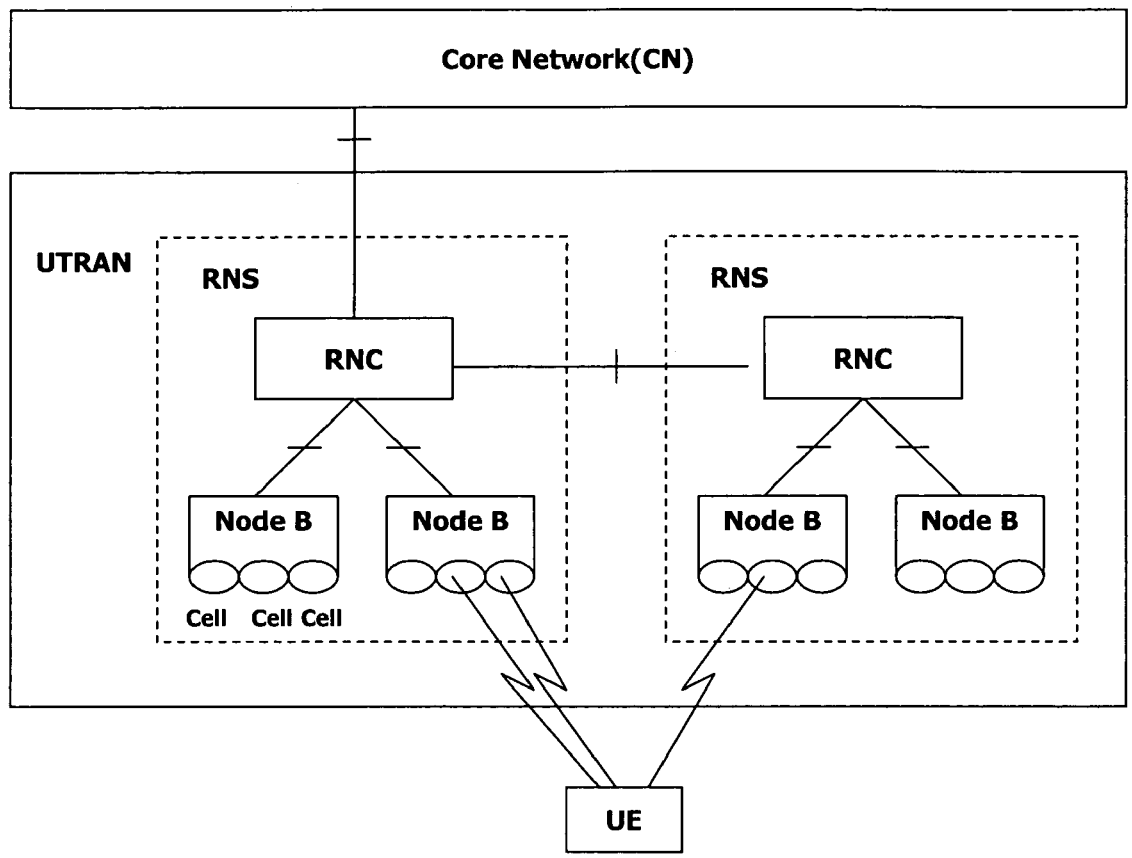
FIG. 1 illustrates a UMTS structure according to an embodiment of the present invention.
Figure 2A:
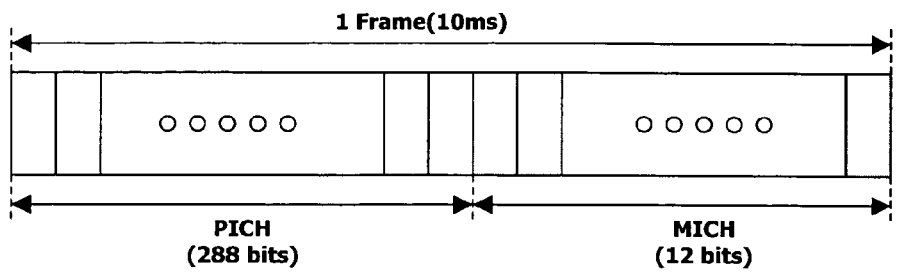
FIGS. 2A and 2B illustrate the structure of MICH (MBMS specific paging Indicator Channel).
Figure 2B:
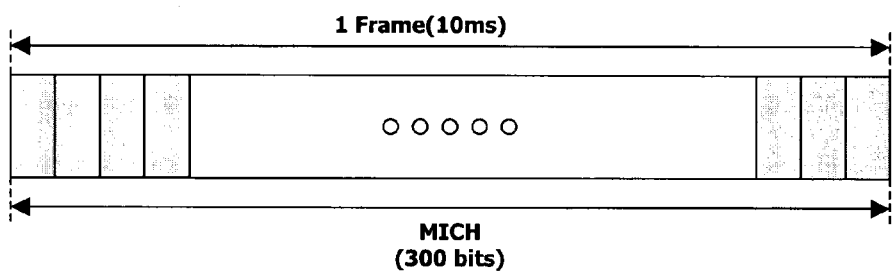
Figure 3:
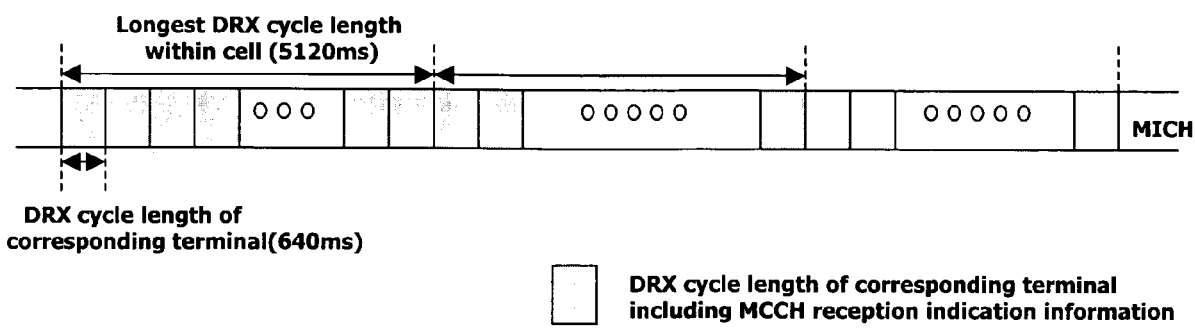
FIG. 3 illustrates one example of related art MICH transmission.
Figure 4:
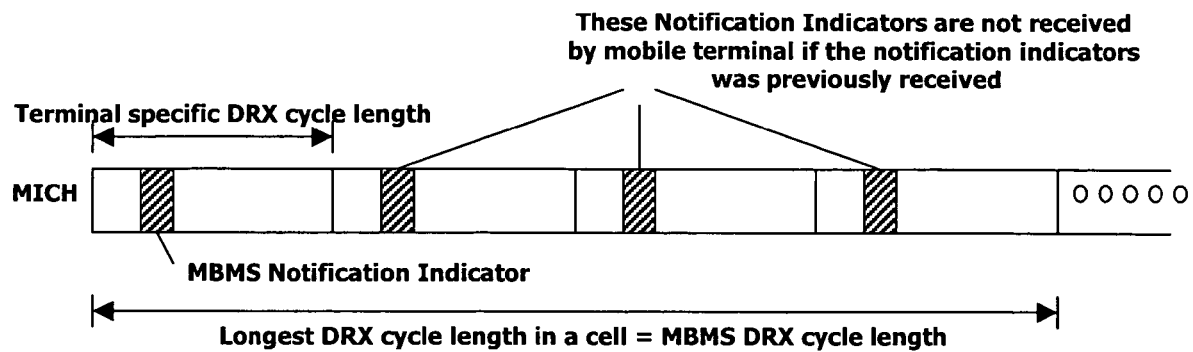
FIG. 4 illustrates a MICH timeline according to one embodiment of the present invention wherein the MBMS DRX cycle length is equal to the longest DRX cycle length being used in a cell.

FIG. 4 illustrates a MICH timeline according to one embodiment of the present invention wherein the MBMS DRX cycle length is equal to the longest DRX cycle length being used in a cell.

If the longest DRX cycle length is a multiple of the terminal-specific DRX cycle length, the network transmits the notification indicator for a specific MBMS service more then one times during the longest DRX cycle length.

Thus, the mobile terminal receives the notification indicator for the specific MBMS service during the terminal-specific DRX cycle length by using the stored terminal-specific DRX cycle length and the longest DRX cycle length. Although the terminal-specific DRX cycle length is usually shorter than the longest DRX cycle length, the mobile terminal suspends receiving the additional notification indicator during the same longest DRX cycle.

Once the mobile terminal receives the MBMS notification indicator during one terminal-specific DRX cycle length of the longest DRX cycle length, it does not receive another notification indicator for the specific MBMS during a different terminal-specific DRX cycle length of the specific longest DRX cycle length.

Figure 5:
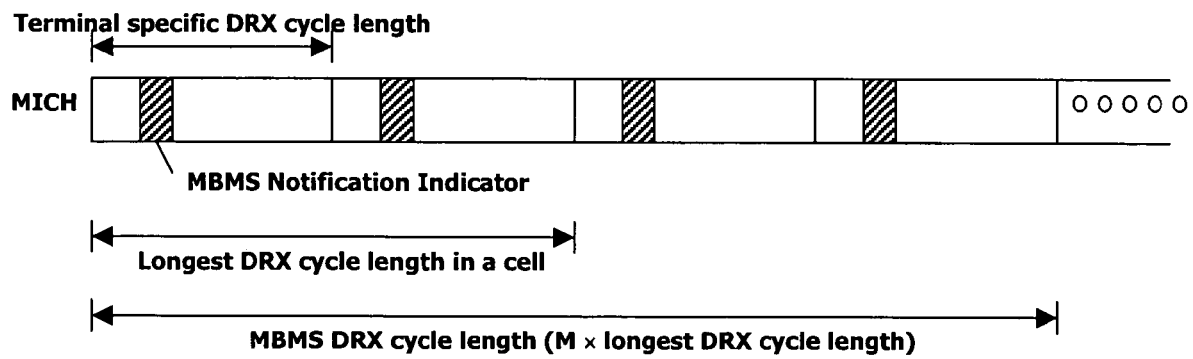
FIG. 5 illustrates a MICH timeline according to another embodiment of the present invention wherein the MBMS DRX cycle length is equal to the longest DRX cycle length times a multiplying factor (M).

FIG. 5 illustrates a MICH timeline according to another embodiment of the present invention wherein the MBMS DRX cycle length is equal to the longest DRX cycle length times a multiplying factor (M).

Referring to FIG. 5, the network broadcasts a number (M) representing a multiplying factor for determining the MBMS DRX cycle length from the longest DRX cycle length. Such M is preferably provided by using a BCCH (Broadcast Channel) in each cell. The number of repeating of the DRX cycle is included in a system information block (SIB) transmitted through the BCCH, like the MBMS DRX cycle length.

After broadcasting the number (M) of repeating of the DRX cycle, the network repeatedly transmits the notification indicator for the specific MBMS during the MBMS DRX cycle length, which is equal to M times the longest DRX cycle length.

The mobile terminal receives and stores the number (M) of repeating of the DRX cycle, and receives the notification indicator for the specific MBMS during the terminal-specific DRX cycle length of the longest DRX cycle length by using the stored value 'M'. And during a different terminal-specific DRX cycle length of the length of M times the specific longest DRX cycle length, the mobile terminal does not receive a notification indicator for the specific MBMS.

As mentioned above, in the present invention, the mobile terminal receives and stores one of a UTRAN specific DRX cycle length or a CN domain specific DRX cycle length according to mobile terminals based on whether RRC is in a connected mode or an idle mode (RRC state), and also receives and stores the MBMS DRX cycle length (the longest DRX cycle length of the cell) used for receiving a notification indicator (MCCH reception indication information) for the MBMS. In addition, the mobile terminal also receives and stores the value of the number (M) of repeating of the MBMS DRX cycle.

Accordingly, the mobile terminal receives the notification indicator for the specific multicast or broadcast during the specific terminal-specific DRX cycle length by using the stored M value, the mobile terminal-specific DRX cycle length and the longest DRX cycle length.

FIG. 5 is a flow chart illustrating a case that when a UTRAN does not transmit an MBMS DRX cycle length, separately from a DRX cycle length, the mobile terminal receives and stores information related to the DRX cycle length.

As shown in FIG. 4, if the UTRAN does not transmit the MBMS DRX cycle length, separately from the DRX cycle length, the mobile terminal receives every DRX cycle length transmitted in a cell together with the DRX cycle length according to mobile terminal's RRC state (step S10) (either in a RRC connected state or an idle state, etc.).

The mobile terminal recognizes the longest DRX cycle length by comparing the received DRX cycle lengths and then stores the DRX cycle length according to its RRC state and the longest DRX cycle length (step S11 and S12). In this case, the MBMX DRX cycle length corresponds to the longest DRX cycle length.

If the UTRAN transmits the MBMS DRX cycle length, separately from the DRX cycle length transmitted as in the related art, the mobile terminal receives and stores both the DRX cycle length according to its RRC state and the MBMS DRX cycle length.

Figure 6:
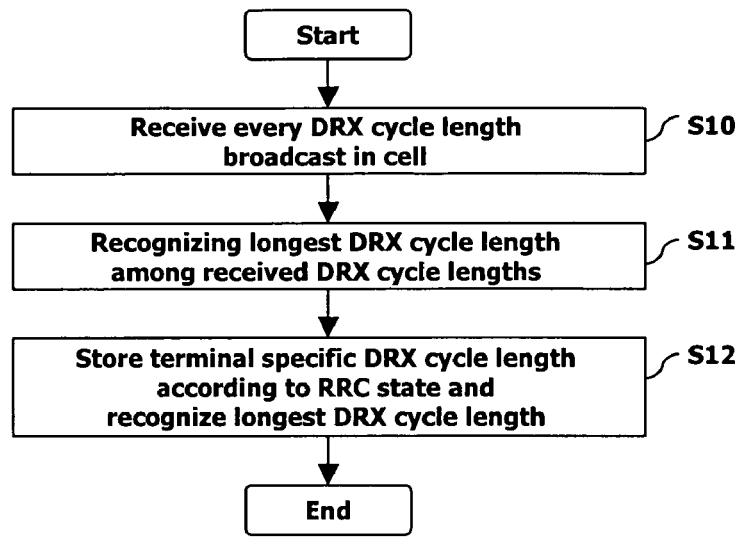
FIG. 6 is a flow chart illustrating a case that when a UTRAN does not transmit an MBMS DRX cycle length, separately from a DRX cycle length, the mobile terminal receives and stores information related to the DRX cycle length.
Figure 7:
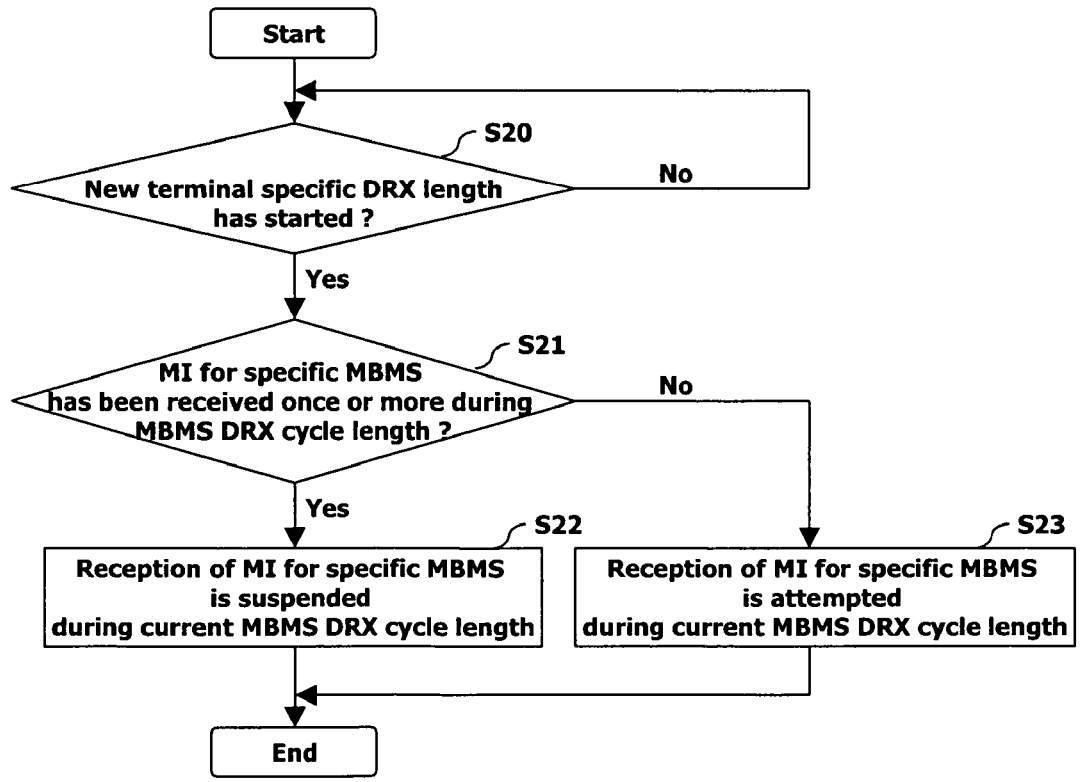
FIG. 7 is a flow chart of a method for discontinuously receiving the MICH by the mobile terminal in accordance with a preferred embodiment of the present invention.

FIG. 6 is a flow chart of a method for discontinuously receiving the MICH by the mobile terminal in accordance with a preferred embodiment of the present invention.

As shown in FIG. 6, the mobile terminal receives the PICH once for every terminal-specific DRX cycle length. In this case, the mobile terminal receives one frame of the PICH during the mobile terminal-specific DRX cycle length, and the received PICH frame corresponds to a mobile terminal identifier.

The terminal determines whether to receive the MICH frame corresponding to the received PICH frame according to the following method. In this method, the mobile terminal-specific DRX cycle length is smaller than or the same as the MBMS DRX cycle length.

First, the mobile terminal determines whether a new terminal-specific DRX cycle length has started (step S20). If a new terminal-specific DRX cycle length has started, the mobile terminal determines whether it has received an MI for a specific MBMS, for which the mobile terminal has subscribed, once or more through the MICH during a current MBMS DRX cycle length (step S21).

If the mobile terminal has not received the MI for the specific MBMS during the current MBMS DRX cycle length including the new terminal-specific DRX cycle length through the MICH, the mobile terminal attempts to receive the MI for the specific MBMS through the MICH during the current terminal-specific DRX cycle length (step S22).

If, however, the mobile terminal has received the MI for the specific MBMS through the MICH during the current MBMS DRX cycle length, the mobile terminal suspends receiving of another MI for the specific MBMS during the current terminal-specific DRX cycle length.

As described above, the method for discontinuously receiving a notification indicator with respect to multicast or broadcast has the following advantages.

Because the mobile terminal stores and uses both the terminal-specific DRX cycle and the longest DRX cycle for the MBMS, it can effectively receive a notification indicator with respect to multicast or broadcast discontinuously. By applying the discontinuous reception method in accordance with the present invention to the wireless system, the problem that the mobile terminal repeatedly receives the same MCCH reception indication information during a specific MBMS DRX cycle length can be avoided. Such elimination of redundant reception of the MI and the MCCH reception indication information reduces processor overhead and power.

It will be apparent to one skilled in the art that the preferred embodiments of the present invention can be readily implemented using, for example, a processor or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of mobile communication system. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teachings can be readily applied to other types of methods and apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method performed by a mobile terminal for receiving a notification indicator for a point-to-multipoint service in a mobile communication system, the method comprising:

receiving a plurality of discontinuous-reception (DRX) cycle lengths from a network;

recognizing the longest DRX cycle length from the plurality of DRX cycle lengths;

determining a point-to-multipoint DRX cycle length based on the longest DRX cycle length; and determining whether to receive the notification indicator for the point-to-multipoint service, wherein if the notification indicator has been received in a point-to-multipoint DRX cycle having the point-to-multipoint DRX cycle length, the mobile terminal suspends receiving of the notification indicator in the same point-to-multipoint DRX cycle, wherein if the notification indicator has not been received in the point-to-multipoint DRX cycle having the point-to-multipoint DRX cycle length, the mobile terminal receives a subsequent notification indicator in the same point-to-multipoint DRX cycle.

2. The method of claim 1, wherein the point-to-multipoint DRX cycle length is equal to the longest DRX cycle length.

3. The method of claim 1, wherein the point-to-multipoint DRX cycle length is M times the longest DRX cycle length, where M is an integer.

4. The method of claim 1, wherein the DRX cycle length is associated with receiving a mobile terminal dedicated indicator from the network.

5. The method of claim 1, wherein the notification indicator contains control information associated with receiving the point-to-multipoint service.

6. The method of claim 1, wherein the notification indicator is provided using a point-to-multipoint paging indicator channel.

7. The method of claim 6, wherein the point-to-multipoint paging indicator channel comprises a MICH.

8. The method of claim 1, wherein the plurality of DRX cycle lengths are provided from one of UTRAN and a core network.

9. A mobile terminal for receiving a notification indicator for a point-to-multipoint service in a mobile communication system, the mobile terminal comprising:
  means for receiving a plurality of discontinuous-reception (DRX) cycle lengths from a network;
  means for recognizing the longest DRX cycle length from the plurality of DRX cycle lengths;
  means for determining a point-to-multipoint DRX cycle length based on the longest DRX cycle length; and
  means for determining whether to receive the notification indicator for the point-to-multipoint service, wherein if the notification indicator has been received in a point-to-multipoint DRX cycle having the point-to-multipoint DRX cycle length, the mobile terminal suspends receiving of the notification indicator in the same point-to-multipoint DRX cycle,
  wherein if the notification indicator has not been received in the point-to-multipoint DRX cycle having the point-to-multipoint DRX cycle length, the mobile terminal receives a subsequent notification indicator in the same point-to-multipoint DRX cycle.

10. The mobile terminal of claim 9, wherein the point-to-multipoint DRX cycle length is equal to the longest DRX cycle length.

11. The mobile terminal of claim 9, wherein the point-to-multipoint DRX cycle length is M times the longest DRX cycle length, where M is an integer.

12. The mobile terminal of claim 9, wherein the DRX cycle length is associated with receiving a mobile terminal dedicated indicator from the network.

13. The mobile terminal of claim 9, wherein the notification indicator contains control information associated with receiving the point-to-multipoint service.

14. The mobile terminal of claim 9, wherein the notification indicator is provided using a point-to-multipoint paging indicator channel.

15. The mobile terminal of claim 14, wherein the point-to-multipoint paging indicator channel comprises a MICH.

16. The mobile terminal of claim 9, wherein the plurality of DRX cycle lengths are provided from one of UTRAN and a core network.

17. A mobile terminal for receiving a notification indicator for a point-to-multipoint service in a mobile communication system, the mobile terminal comprising:
  means for receiving a plurality of discontinuous-reception (DRX) cycle lengths from a network;
  a processor that recognizes the longest DRX cycle length from the plurality of DRX cycle lengths and determines a point-to-multipoint DRX cycle length based on the longest DRX cycle length, wherein the processor determines whether to receive the notification indicator for the point-to-multipoint service, wherein if the notification indicator has been received in a point-to-multipoint DRX cycle having the point-to-multipoint DRX cycle length, the mobile terminal suspends receiving of the notification indicator in the same point-to-multipoint DRX cycle,
  wherein if the notification indicator has not been received in the point-to-multipoint DRX cycle having the point-to-multipoint DRX cycle length, the mobile terminal receives a subsequent notification indicator in the same point-to-multipoint DRX cycle.

18. The mobile terminal of claim 17, wherein the point-to-multipoint DRX cycle length is equal to the longest DRX cycle length.

19. The mobile terminal of claim 17, wherein the point-to-multipoint DRX cycle length is M times the longest DRX cycle length, where M is an integer.

20. The mobile terminal of claim 17, wherein the DRX cycle length is associated with receiving a mobile terminal dedicated indicator from the network.

21. The mobile terminal of claim 17, wherein the notification indicator contains control information associated with receiving the point-to-multipoint service.

22. The mobile terminal of claim 17, wherein the notification indicator is provided using a point-to-multipoint paging indicator channel.

23. The mobile terminal of claim 22, wherein the point-to-multipoint paging indicator channel comprises a MICH.

24. The mobile terminal of claim 22, wherein the plurality of DRX cycle lengths are provided from one of UTRAN and a core network.

* * * * *